United States Patent [19]

Gallucci et al.

[11] Patent Number: 5,814,712
[45] Date of Patent: Sep. 29, 1998

[54] IMPACT-MODIFIED THERMOPLASTICS RESIN MOLDING COMPOSITIONS AND ARTICLES MOLDED THEREFROM

[75] Inventors: Robert Russell Gallucci; Paul Joseph Hans, both of Mt. Vernon, Ind.; Joseph Maria Henri Janssen, Bergen op Zoom, Netherlands; Woodie Daniel Mordecai; Matthew Robert Pixton, both of Mt. Vernon, Ind.

[73] Assignee: General Electric Company, Pittsfield, Mass.

[21] Appl. No.: 637,953

[22] Filed: Apr. 25, 1996

[51] Int. Cl.$^6$ .................................................. C08L 77/06
[52] U.S. Cl. ......................... 525/436; 525/67; 525/133; 525/146; 525/148; 525/439
[58] Field of Search ............................ 525/67, 133, 146, 525/148, 436, 439

[56] References Cited

U.S. PATENT DOCUMENTS

| | | | |
|---|---|---|---|
| 4,753,980 | 6/1988 | Deyrup | 524/369 |
| 4,753,988 | 6/1988 | Henton et al. | 525/73 |
| 4,912,167 | 3/1990 | Deyrup et al. | 525/166 |
| 5,112,913 | 5/1992 | Horiuchi et al. | 525/133 |
| 5,369,154 | 11/1994 | Laughner | 523/436 |

OTHER PUBLICATIONS

Polymer Preprints 34 (2), 848 (Aug. 1993), Reactive Toughening of Pet–Polycarbonate Blends, M.K. Akkapeddi*, B. VanBuskirk and C.D. Mason, Engineered Plastics R&T, Allied Signal Inc., Morristown, NJ 07962.

Effects of Component Addition Protocol on the Reactive Compatibilization of HDPE/PET Blendsm Sanjiv S. Dagli and Kunal M. Kamdar, Polymer Engineering and Science, Mid–Dec. 1994, vol.34, No.23.

Abstract—CA Engineering thermoplastic resin compositions. Suga, Katsufumi; Yoshihiro (Nippon Petrochemicals Co., Ltd.) (Sep. 30, 1992).

Primary Examiner—Terressa Mosley

[57] ABSTRACT

A method for making an impact modified thermoplastic resin composition includes combining an glycidyl ester impact modifier with a polycarbonate resin to form a glycidyl ester impact modifier-polycarbonate resin blend and then combining the glycidyl ester impact modifier-polycarbonate resin blend with a polyester resin to provide the impact modified thermoplastic resin composition. Articles molded from the impact modified thermoplastic resin composition made according to the method exhibit high impact resistance and improved surface appearance.

16 Claims, No Drawings

IMPACT-MODIFIED THERMOPLASTICS RESIN MOLDING COMPOSITIONS AND ARTICLES MOLDED THEREFROM

FIELD OF THE INVENTION

The present invention relates to impact modified thermoplastic resin compositions, and, more particularly, to impact modified compositions containing a blend of a polyester resin and a polycarbonate resin.

BACKGROUND OF THE INVENTION

Impact-modified thermoplastic resin blends that include a polyester resin, a polycarbonate resin and a glycidyl ester impact modifier are known, see, e.g., U.S. Pat. Nos. 5,112,913 and 5,369,154, and have been used to mold articles, e.g., automotive components such as mirror housings and cowl vent grilles, wherein a glossy, defect-free surface appearance is of extreme importance.

While articles molded from known impact-modified polyester resin/polycarbonate resin blends provide, e.g., good impact performance, the aesthetic appearance of the surface of such articles has been found to be deficient in some applications, i.e., the surface of such articles have been found to be unacceptably marred by streaks and pits on an otherwise glossy surface.

SUMMARY OF THE INVENTION

A first aspect of the present invention is a method for making an impact modified thermoplastic resin composition, comprising:
  combining a glycidyl ester impact modifier with a polycarbonate resin to form a glycidyl ester impact modifier/polycarbonate resin blend;
  combining the glycidyl ester impact modifier/polycarbonate resin blend with a polyester resin to provide the impact modified thermoplastic resin composition.

A second aspect of the present invention is a method for making an impact resistant article, comprising:
  combining a glycidyl ester impact modifier with a polycarbonate resin to form a glycidyl ester impact modifier/polycarbonate resin blend;
  combining the glycidyl ester impact modifier/polycarbonate resin blend with a polyester resin to provide an impact modified thermoplastic resin composition,
  molding the impact modified thermoplastic resin composition to form the impact resistant article.

Articles molded from the impact modified thermoplastic resin composition made by the method of the present invention exhibit high impact resistance and improved surface appearance.

DETAILED DESCRIPTION OF THE INVENTION

Polycarbonate Resin

Aromatic polycarbonate resins suitable for use in the present invention, methods of making polycarbonate resins and the use of polycarbonate resins in thermoplastic molding compounds are well known in the art, see, generally, U.S. Pat. Nos. 3,169,121, 4,487,896 and 5,411,999, the respective disclosures of which are each incorporated herein by reference.

Aromatic polycarbonate resins are, in general, prepared by reacting a dihydric phenol, e.g., 2,2-bis-(4-hydroxyphenyl) propane ("bisphenol A"), 2,2-bis(3,5-dimethyl4-hydroxyphenyl)propane, bis(2-hydroxyphenyl) methane, 2,6-dihydroxy naphthalene, hydroquinone, 2,4'-dihydroxyphenyl sulfone and 4,4'-dihydroxy-3,3-dichlorophenyl ether, with a carbonate precursor, e.g., carbonyl bromide and carbonyl chloride, a halogen formate, a bishaloformate of a dihydric phenol or a carbonate ester, e.g., diphenyl carbonate, dichlorophenyl carbonate, dinaphthyl carbonate, phenyl tolyl carbonate and ditolyl carbonate.

In a preferred embodiment, the aromatic polycarbonate resin comprises one or more resins selected from linear aromatic polycarbonate resins, branched aromatic polycarbonate resins and poly(ester-carbonate) resins.

Suitable linear aromatic polycarbonates resins include, e.g., bisphenol A polycarbonate resin.

Suitable branched aromatic polycarbonates are made, e.g., by reacting a polyfunctional aromatic compound, e.g., trimellitic anhydride, trimellitic acid, trimesic acid, trihydroxy phenyl ethane or trimellityl trichloride, with a dihydric phenol and a carbonate precursor to form a branching polymer.

Suitable poly(ester-carbonate) copolymers are made, e.g., by reacting a difunctional carboxylic acid, terephthalic acid, 2,6-naphthalic acid, or a derivative of a difunctional carboxylic acid, e.g., an acid chloride, with a dihydric phenol and a carbonate precursor.

In a preferred embodiment, the polycarbonate resin has an intrinsic viscosity of about 0.3 to about 1.5 deciliters per gram in methylene chloride at 25° C.

In a preferred embodiment, the polycarbonate resin is a linear polycarbonate resin that is derived from bisphenol A and phosgene. In an alternative preferred embodiment, the polycarbonate resin is a blend of two or more polycarbonate resins.

Suitable aromatic polycarbonate resins are commercially available, e.g., LEXAN™ bisphenol A-type polycarbonate resins from General Electric Company.

The Glycidyl Ester Impact Modifier

Suitable glycidyl ester impact modifiers are polymers that comprise repeating units derived from one or more glycidyl ester monomers. As used herein, the terminology "glycidyl ester monomer" means a glycidyl ester of an ethylenically unsaturated carboxylic acid such as, e.g., acrylic acid, methacrylic acid, itaconic acid, and includes, e.g., glycidyl acrylate, glycidyl methacrylate, glycidyl itaconate. In a preferred embodiment, the glycidal ester monomer is glycidal acrylate or glycidyl methacrylate.

In a preferred embodiment, the glycidyl ester impact modifier comprises first repeating units derived one or more glycidyl ester monomers and second repeating units derived from one or more α-olefin monomers, e.g., ethylene, propylene, 1-butene, 1-pentene.

Suitable glycidyl ester copolymers may, optionally, contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and $(C_1-C_{20})$alkyl (meth)acrylates such as, e.g., butyl acrylate, methyl methacrylate, cyclohexyl methacrylate. As used herein, the term "$(C_1-C_{20})$alkyl" means a straight or branched alkyl group of from 1 to 20 carbon atoms per group, such as e.g., methyl, ethyl, decyl, eicosyl, cyclohexyl and the term "(meth)acrylate" refers collectively to acrylate compounds and methacrylate compounds.

In a preferred embodiment, the glycidyl ester impact modifier comprises from 0.5 to 40 wt %, preferably from 1 to 30 wt %, and more preferably from 2 to 20 wt %, of units derived from the glycidyl ester monomer.

Suitable glycidyl ester copolymers can be made by, e.g., conventional free radical initiated copolymerization or graft polymerization methods.

In a highly preferred embodiment, the glycidyl ester impact modifier is a random copolymer having a relative composition according to structural formula (1):

$$\text{+CH}_2\text{—CH}\overset{R_2}{\underset{R_1}{|}}_a\text{+CH}_2\text{—C}\overset{R_2}{\underset{\underset{\underset{H_2C-HC-CH_2}{\diagdown\diagup}}{O}}{\overset{|}{\underset{|}{O=C}}}}_b\text{+CH}_2\text{—C}\overset{R_3}{\underset{\underset{R_4}{O}}{\overset{|}{\underset{|}{O=C}}}}_c\text{+CH}_2\text{—C}\overset{R_5}{\underset{\underset{R_6}{C=O}}{\overset{|}{\underset{|}{O}}}}_d \quad (1)$$

wherein:

$R_1$ is H, alkyl or aryl;

$R_2$, $R_3$ and $R_5$ are each independently H or $(C_1-C_6)$alkyl;

$R_4$ and $R_6$ are each independently alkyl or aryl;

a+b+c+d=100;

a is from 50 to 99.5;

b is from 0.5 to 25;

c is from 0 to 50; and d is from 0 to 50.

In a more highly preferred embodiment, $R_1$ is H, $(C_1-C_{20})$ alkyl, $(C_5-C_{20})$cycloalkyl or $(C_6-C_{20})$aryl. As used herein, the term "$(C_5-C_{20})$cycloalkyl" means a cyclic alkyl group of from 5 to 20 carbon atoms per group such as e.g., cyclohexyl, cyclooctyl, and the term "$(C_6-C_{20})$aryl" means a hydrocarbon group that includes one or more unsaturated six-membered carbon rings, and may, optionally, be substituted with one or more alkyl groups on one of the aromatic rings, to form a substituent group having a total of from 6 to 20 carbon atoms per group, such as, e.g., phenyl, naphthyl, tolyl, xylyl, mesityl, isopropyl phenyl.

In a more highly preferred embodiment, $R_2$, $R_3$ and $R_5$ are each independently H or methyl.

In a more highly preferred embodiment, $R_4$ and $R_6$ are each independently $(C_1-C_{20})$alkyl.

In a more highly preferred embodiment, $R_1$ is H, $R_2$ and $R_3$ are each independently H or methyl, each $R_4$ is independently $(C_1-C_4)$alkyl, a is from 45 to 75, b is from 5 to 15, c is from 20 to 40 and d is 0.

In a preferred embodiment, the melt index, as measured at 190° C. according to ASTM D-1238, of the glycidyl ester impact modifier is from 0.1 to 100 grams/10 minutes and preferably from 0.5 to 30 grams/10 minutes.

In a preferred embodiment, the glycidyl ester impact modifier comprises one or more copolymers selected from olefin-glycidyl (meth)acrylate copolymers, olefin-vinyl acetate-glycidyl (meth)acrylate copolymers and olefin-glycidyl (meth)acrylate-alkyl (meth)acrylate copolymers.

The glycidyl ester impact modifier and polycarbonate resin are combined, preferably by melt blending, to form the glycidyl ester impact modifier/polycarbonate resin blend.

In a highly preferred embodiment, the glycidyl ester impact modifier and the polycarbonate resin are combined and subjected to mixing in the molten state, e.g., in an extruder or a continuous mixer, then shaped, e.g., by extrusion, then cooled and then reduced to particulate form, e.g., by pelletizing, to produce the glycidyl ester impact modifier/polycarbonate resin blend of the present invention.

In a first highly preferred embodiment, solid particles of the glycidyl ester impact modifier and the polycarbonate resin are pre-mixed by combining the particles and mechanically mixing the combined particles, e.g., in a drum mixer, and the resultant particulate pre-mix is then melt blended.

In an alternative highly preferred embodiment, metered amounts of solid particles of the glycidyl ester impact modifier and of the polycarbonate resin are simultaneously fed to a device for melt blending without a pre-mixing step.

In a preferred embodiment, the polycarbonate resin is divided into two portions and a first portion of the polycarbonate resin is combined with the glycidyl ester impact modifier to form the glycidyl ester impact modifier/polycarbonate resin blend and a second portion of the polycarbonate resin is subsequently added, e.g., at the same time the glycidyl ester impact modifier/polycarbonate resin blend is combined with the polyester resin, to form the impact-modified thermoplastic resin composition of the present invention as discussed below. In the preferred embodiment, the first and second portions of the polycarbonate resin each independently comprise one or more resins selected from the above-disclosed polycarbonate resins. In a more highly preferred embodiment, the first and second portions each independently comprise blends of two or more polycarbonate resins.

In a preferred embodiment, the glycidyl ester impact modifier/polycarbonate resin blend of the present invention comprises from 50 to 95 parts by weight ("pbw") more preferably from 75 to 90 pbw, of the polycarbonate resin and from 5 to 50 pbw, more preferably from 10 to 25 pbw, of the glycidyl ester impact modifier, each based on 100 pbw of the glycidyl ester impact modifier/polycarbonate resin blend.

Polyester Resin

Polyester resins suitable for use in the present invention, methods for making polyester resins and the use of polyester resins in thermoplastic molding compositions are well known in the art, see, generally, U.S. Pat. Nos. 2,465,319, 5,367,011 and 5,411,999, the respective disclosures of which are each incorporated herein by reference.

Suitable polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units according to structural formula (2):

$$\text{+O+CH}_2\text{)}_n\text{O}-\overset{O}{\underset{}{\overset{\|}{C}}}-R-\overset{O}{\underset{}{\overset{\|}{C}}}\text{+} \quad (2)$$

wherein:

n is an integer of from 2 to 6, and

R is an aryl radical comprising a decarboxylated residue derived from an aromatic dicarboxylic acid.

Examples of aromatic dicarboxylic acids from which the decarboxylated residue R may be derived are acids that contain a single aromatic ring per molecule such as, e.g., isophthalic or terephthalic acid, 1,2-di(p-carboxyphenyl) ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

In a preferred embodiment, the polyester resin comprises one or more resins selected from linear polyester resins, branched polyester resins and copolymeric polyester resins.

Suitable linear polyester resins include, e.g., poly(alkylene phthalate)s such as, e.g., poly(ethylene terephthalate) ("PET"), poly(butylene terephthalate) ("PBT"), poly(propylene terephthalate) ("PPT"), poly(cycloalkylene phthalate)s such as, e.g., poly(cyclohexanedimethanol terephthalate) ("PCT"), poly(alkylene naphthalate)s such as, e.g., poly(butylene-2,6-naphthalate) ("PBN") and poly(ethylene-2,6-naphthalate) ("PEN"), poly(alkylene dicarboxylate)s such as, e.g., poly(butylene dicarboxylate). Suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PETG") copolymers.

In a preferred embodiment, the polyester resin comprises one or more resins selected from selected from PBT and PET resins. In a first highly preferred embodiment, the polyester resin comprises a PBT resin. In a second highly preferred embodiment, the polyester resin comprises a PET resin. In a third highly preferred embodiment, the polyester resin comprises a blend of two or more polyester resins, more preferably, a blend of from 1 to 99 pbw poly(ethylene terephthalate) and from 1 to 99 pbw poly(1,4-butylene terephthalate), based on 100 pbw of the blend.

In a preferred embodiment, the polyester resin has an intrinsic viscosity of from about 0.4 to about 2.0 dl/g as measured in a 60:40 phenol/tetrachloroethane mixture at 23°–30° C.

Suitable polyester resins are commercially available, e.g., VALOX™ polyester resins from General Electric Company.

In a preferred embodiment, the glycidyl ester impact modifier/polycarbonate resin blend and the polyester resin are blended in the molten state, e.g., in an extruder or a continuous mixer, then shaped, e.g., by extrusion, then cooled and then, preferably, reduced to particulate form, e.g., by chopping an extrudate into pellets, to produce the impact-modified thermoplastic resin composition of the present invention.

In a first highly preferred embodiment, solid particles of the glycidyl ester impact modifier/polycarbonate resin and the polyester resin are pre-mixed by combining the particles and mechanically mixing the combined particles, e.g., in a drum mixer, and the resultant particulate pre-mix is then melt blended.

In an alternative highly preferred embodiment, metered amounts of solid particles of the glycidyl ester impact modifier/polycarbonate resin blend and the polyester resin are simultaneously fed to a mixing device for melt blending, without a pre-mixing step.

In a preferred embodiment, the glycidyl ester impact modifier is, as discussed above, combined with a first portion of the polycarbonate resin to form the glycidyl ester impact modifier/polycarbonate resin blend and the glycidyl ester impact modifier/polycarbonate resin blend is subsequently combined with the polyester resin and a second portion of the polycarbonate resin to provide the impact modified thermoplastic resin composition of the present invention.

In a preferred embodiment, the thermoplastic resin composition of the present invention comprises from 10 to 90 pbw, more preferably from 20 to 50 pbw, of the thermoplastic polyester resin, from 10 to 90 pbw, more preferably from 50 to 80 pbw, of the polycarbonate resin and from 0.5 to 20 pbw, more preferably from 0.5 to 5 pbw, of the glycidyl ester impact modifier, each based on 100 pbw of the thermoplastic resin composition.

The composition of the present invention may optionally include other impact modifiers, e.g., "core-shell" copolymers, polyolefin rubber copolymers and styrenic impact modifiers in addition to the glycidyl ester impact modifier.

Core-shell copolymers, methods of making core-shell copolymers and the use of core-shell copolymers as impact modifiers in combination with polycarbonate resins and polyester resins are known in the art, see, e.g., U.S. Pat. Nos. 3,864,428 and 4,264,487.

Suitable core-shell copolymers are those that include a rubbery "core" that has a glass transition temperature ("$T_g$") below about 10° C. and that comprises repeating units derived from one or more monoethylenically unsaturated monomers such as, e.g., acrylate monomers, e.g., butyl acrylate, and conjugated diene monomers, e.g., butadiene, and a rigid "shell" that has a $T_g$ of greater than or equal to about 10° C. and that comprises repeating units derived from a monoethylenically unsaturated monomer, e.g., methyl methacrylate.

Suitable polyolefin rubber copolymers include, e.g., ethylene-alkyl (meth)acrylate copolymers such as ethylene-ethyl acrylate copolymers, ethylene-alkyl vinyl ester copolymers, ethylene-propylene rubber (EPR) copolymers, ethylene-propylene-non-conjugated diene monomer-type (EPDM) terpolymers and styrene-acrylonitrile/ethylene-propylene-non-conjugated diene monomer graft copolymers. Methods of making such polyolefin rubber copolymers and the use of such polyolefin rubber copolymers in combination with polycarbonate resins and polyester resins are known in the art, see, e.g., U.S. Pat. Nos. 4,550,138, 4,485,212, and 4,493,921.

Suitable styrenic copolymers useful as impact modifiers include, e.g., acrylonitrile-butadiene-styrene ("ABS") copolymers, acrylonitrile-butadiene-α-methylstyrene copolymers, styrene-butadiene copolymers, styrene-butadiene-styrene ("SBS") block copolymers, styrene-(ethylene-butylene)-styrene ("SEBS") copolymers, methacrylate-butadiene-styrene ("MBS") copolymers, and other high impact styrene-containing copolymers.

In a preferred embodiment, the composition of the present invention includes a stabilizer compound for improving the stability of the melt viscosity of the composition of the present invention. Suitable stabilizers and their use in polyester resin-polycarbonate resin blends is known, see, e.g., U.S. Pat. No. 5,441,997, the disclosure of which is incorporated herein by reference. Suitable stabilizers include, e.g., alkaryl phosphites such as, e.g., diphenyl dodecyl phosphite, acidic phosphate salts such as, e.g., mono zinc phosphate, poly acid pyrophosphates and salts thereof such as, e.g., $Na_2H_2P_2O_7$, phosphate salts of Group IB or IIB metals such as, e.g., zinc phosphate and phosphorus oxo acids such as, e.g., phosphoric acid.

The composition of the present invention may, optionally, further include one or more other additives known in the art, such as, e.g., mica, glass fibers, milled glass, flaked glass, wollastonite, clay, talc, carbon fibers, ceramic fibers, titanate fibers, nucleants, colorants, flame retardants, antistatic agents, antioxidants, ultraviolet stabilizers and thermal stabilizers.

The thermoplastic resin molding compound of the present invention can be molded into useful articles, e.g., by injection molding, and preferably by injection molding using a mold having one or more polished mold surfaces for producing as-molded parts with one or more high gloss surfaces.

The composition of the present invention is particularly well suited for application in articles having a high gloss surface, e.g., automotive articles such as e.g., mirror housings, door handles, grilles, as well as lawn and garden equipment, sporting goods, electronic equipment, business equipment, housewares and packaging materials.

EXAMPLE 1 AND COMPARATIVE EXAMPLES C1 AND C2

The composition of Example 1 was made as set forth below.

A glycidyl ester impact modifier/polycarbonate resin blend was made by melt blending 20 pbw glycidyl acrylate impact modifier having a nominal composition of 67 wt % ethylene, 25 wt % methyl methacrylate and 8 wt % glycidyl methacrylate (LOTADER™ AX8900 impact modifier, Elf Atochem) with 80 pbw of a polycarbonate resin blend (22 wt % LEXAN™ 120 resin and 58 wt % LEXAN™ 105 resin, each from General Electric Company) in a single screw extruder at 250 to 300° C.

An impact-modified thermoplastic resin blend was then made by melt blending 10 pbw of particles of the above-described glycidyl ester impact modifier/polycarbonate resin blend with 30 pbw of particles of polybutylene terephthalate resin (VALOX™ 315 polybutylene terephthalate resin, General Electric Company), 30 pbw LEXAN 120™ polycarbonate resin and 30 pbw LEXAN™ 125 polycarbonate resin in a twin-screw co-rotating extruder operated at 250° C. to 300° C. and extruding the mixture.

In addition to the above listed components, the following additives were added to the impact-modified thermoplastic resin composition of Example 1 during the second of the above-discussed melt blending steps: 2 pbw of a carbon black blend consisting of 80 wt % of a 50/50 blend of LEXAN™ 120 and LEXAN™ 105 resin polycarbonate resins and 20 wt % carbon black, 0.2 pbw hindered phenol antioxidant (IRGANOX™ 1076, Ciba-Geigy), 0.2 pbw aryl phosphite (IRGAFOS™ 168, Ciba-Geigy), 0.54 pbw UV stabilizer (benzotriazole) and 0.1 pbw monozinc phosphate dihydrate acid salt.

The composition of Comparative Example C1 was made by combining the materials set forth above in Example 1 in the same relative amounts as set forth in Example 1, except that instead of pre-blending the glycidyl ester impact modifier with the polycarbonate resin, the glycidyl ester impact modifier, polycarbonate resin and polyester resin were simultaneously fed to the feed throat of the extruder.

The composition of Comparative Example C2 included the same relative amounts of the same materials as set forth above for the composition of Example 1, but in Comparative Example C2 the glycidyl ester impact modifier was pre-blended with the PBT resin to form a glycidyl ester impact modifier/PBT resin blend which was subsequently melt-blended with the polycarbonate resin in the extruder to form an impact-modified thermoplastic resin blend.

The melt viscosity, room temperature notched Izod impact (ASTM D256) and tensile elongation at break (ASTM D 638) were measured for each of the compositions of Example 1 and Comparative Examples C1 and C2. Samples for determining melt viscosity were dried for 1 hour at 150° C. and the melt viscosity was then measured by extruding each of the samples (sample size of approximately 10 grams) at 266° C. through a 0.0825 inch diameter orifice under a 4900 gram weight over a dwell time of 5 minutes.

The compositions of Example 1 and of Comparative Examples C1 and C2 were injection molded under the conditions set forth below to form sample plaques.

All molding materials were dried in a forced air convection oven at 125° C. for 3 to 4 hours prior to molding.

The plaque molding tool was 5 inches by 6 inches by 0.125 inches in size and was double-gated with tab gates positioned on one of the long sides of the mold, each approximately 1 inch from one of the respective corners of the mold. A highly polished, chromed flat plate was used on the "B" mold half.

The molding tool was secured in an 80 ton Van Dorn injection molding machine and the machine was then operated under the following conditions:

a flat profile of 500° F. (rear/center/front/nozzle) on the barrel and 150° F. on the mold halves was used;

an injection pressure of 1500 pounds per square inch, gauge (psig) was used in the first stage and 500 psig was used in the second stage, with a back pressure of 50–75 psig; and the extruder rate was 100–125 revolutions per minute (rpm) with a shot size of approximately 4.625 inches, a cushion of 0.125 to 0.250 inches and a slow injection rate for an injection time of 10 seconds, with transfer from first stage to second stage at approximately 0.5 inches and a closed mold time of 17 seconds, for a total cycle time of 29 seconds.

The surface appearance of the sample plaque surfaces that had been molded in contact with the highly polished "B" side of the mold were visually inspected (by eye, without magnification) to detect pitting and streaking.

The test results, i.e., the melt viscosity, expressed in Poise (MV at 266° C., (Poise)), room temperature notched Izod Impact, expressed in foot-pounds (NII(ft-lb)), tensile elongation at break, expressed as a percentage (TE (%)) and surface appearance of the molded plaques on visual inspection are set forth below in TABLE 1 for each of the compositions of Example 1 and Comparative Examples C1 and C2.

TABLE 1

| | Ex # | | |
|---|---|---|---|
| | 1 | C1 | C2 |
| MV (266° C., Poise) | 11687 | 9788 | 10991 |
| NII (ft-lb/in) | 14.6 | 15.2 | 16.4 |
| TE (%) | 132 | 153 | 103 |
| Surface Appearance | no pitting or streaking | pitting | streaking |

EXAMPLE 2 AND COMPARATIVE EXAMPLE C3

The compositions of Example 2 and Comparative Example C3 were made in a manner analogous to that set forth above for Example 1 and Comparative Example C2, except that a polyethylene terephthalate resin (CRYSTAR™ 3948 from E.I. DuPont de Nemours) was used as the polyester resin in Example 2 and a blend of 20 pbw glycidyl ester impact modifier and 80 pbw of the polyethylene terephthalate resin was used in Comparative Example C3.

The relative amounts of polycarbonate resin, polyester resin, polycarbonate resin/glycidyl ester impact modifier blend and polyester resin/glycidyl ester impact modifier blend used in each of the compositions are set forth below in Table 2. In addition, each of the compositions included 2.4 pbw of a carbon black/resin blend consisting of 25 wt % carbon black and 75 wt % polycarbonate resin and 0.1 pbw mono zinc phosphate stabilizer.

Plaques of each of the compositions were molded by a method analogous to that set forth above in Example 1, except that (i) a flat temperature profile of 530° F. across the mold barrel was used during the injection molding step and (ii) the mold cavity was incompletely filled, i.e., to approximately 75% full, to exaggerate the appearance of any surface imperfections in the molded parts. Some of the surface imperfections in parts molded by the process of Example 1, i.e., using a completely filled mold, can difficult to detect by virtue of having been "pressed out" of the surface. Use of the technique wherein the mold cavity was incompletely filled made it easier to see the streaks, pits and other surface imperfections in the surfaces of the parts. The sample plaque surfaces were visually inspected (by eye, without magnification) and the appearance of each of the surfaces are noted below in Table 2.

TABLE 2

|  | EX # | |
| --- | --- | --- |
|  | 2 | C3 |
| PET (pbw) | 4.65 | 44.64 |
| PC (pbw) | 42.85 | 2.85 |
| 80 PC/20 GMA Blend (pbw) | 0 | 50 |
| 80 PET/20 GMA Blend (pbw) | 50 | 0 |
| Surface Appearance | dimples/gels | smooth surface |

PET is CRYSTAR ™3948 polyethylene terephthalate resin from E. I. DuPont de Nemours
PC is LEXAN ™145 polycarbonate resin from General Electric Company
GMA is LOTADER ™AX8900 impact modifier from Elf Atochem Articles molded from the impact modified thermoplastic resin composition made by the method of the present invention exhibit high impact resistance and improved surface appearance.

We claim:

1. A method for making an impact modified thermoplastic resin composition, comprising:

combining a glycidyl ester impact modifier with a polycarbonate resin to form a glycidyl ester impact modifier/polycarbonate resin blend;

said glycidyl ester impact modifier/polycarbonate resin blend consisting essentially of from 50 to 95 parts by weight polycarbonate resin and from 5 to 50 parts by weight of said glycidyl ester impact modifier; and combining the glycidyl ester impact modifier/polycarbonate resin blend with a polyester resin to provide the impact modified thermoplastic resin composition.

2. The method of claim 1, wherein the polycarbonate resin comprises a bisphenol A polycarbonate resin.

3. The method of claim 1, wherein the polycarbonate resin is a blend of two or more polycarbonate resins.

4. The method of claim 1, wherein the glycidyl ester impact modifier is a random copolymer having the structural formula:

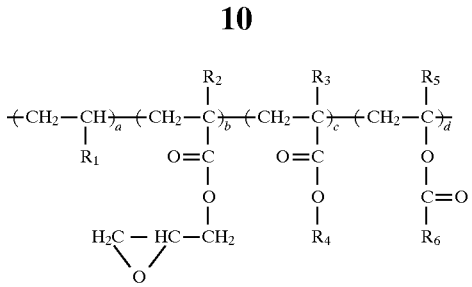

wherein:

$R_1$ is H, alkyl or aryl;

$R_2$, $R_3$ and $R_5$ are each independently H or $(C_1-C_6)$alkyl;

$R_4$ and $R_6$ are each independently alkyl or aryl;

$a+b+c+d=100$;

a is from 50 to 99.5;

b is from 0.5 to 25;

c is from 0 to 50; and d is from 0 to 50.

5. The method of claim 4, wherein $R_1$ is H,, $R_2$ and $R_3$ are each independently H or methyl, each $R_4$ is independently $(C_1-C_4)$alkyl, a is from 45 to75, b is from 5 to 15, c is from 20 to 40 and d is 0.

6. The method of claim 1, wherein the polyester resin comprises one or more resins selected from poly(ethylene terephthalate) resins and poly(butylene terephthalate) resins.

7. The method of claim 1, wherein the polyester resin is a blend of two or more polyester resins.

8. The method of claim 1, wherein the glycidyl ester impact modifier is combined with a first portion of the polycarbonate resin to form the glycidyl ester impact modifier/polycarbonate resin blend and the glycidyl ester impact modifier/polycarbonate resin blend is combined with a polyester resin and a second portion of the polycarbonate resin to provide the impact modified thermoplastic resin composition.

9. The method of claim 8, wherein the first and second portions of the polycarbonate resin each independently comprise one or more polycarbonate resins.

10. The method of claim 1, wherein the glycidyl ester impact modifier/polycarbonate resin blend comprises from 50 to 95 parts by weight of the polycarbonate resin and from 5 to 50 parts by weight of the glycidyl ester impact modifier, each based on 100 parts by weight of the glycidyl ester impact modifier/polycarbonate resin blend.

11. The method of claim 1, wherein the impact modified thermoplastic resin composition comprises from 10 to 90 parts by weight of the thermoplastic polyester resin, from 10 to 90 parts by weight of the polycarbonate resin and from 0.5 to 20 parts by weight of the glycidyl ester impact modifier, each based on 100 parts by weight of the resin composition.

12. The method of claim 1, wherein the glycidyl ester impact modifier is combined with the polycarbonate resin by melt blending.

13. The method of claim 1, wherein the glycidyl ester impact modifier/polycarbonate resin blend is combined with the polyester resin by melt blending.

14. An impact modified thermoplastic resin composition made by the method of claim 1.

15. A method for making an impact resistant article, comprising:

combining a glycidyl ester impact modifier with a polycarbonate resin to form a glycidyl ester impact modifier/polycarbonate resin blend;

combining the glycidyl ester impact modifier/polycarbonate resin blend with a polyester resin to provide the impact modified thermoplastic resin composition, molding the impact modified thermoplastic resin composition to form the impact resistant article.

16. An impact resistant article made by the method of claim 15.

* * * * *